(12) United States Patent
Tao et al.

(10) Patent No.: US 7,137,148 B2
(45) Date of Patent: Nov. 21, 2006

(54) PVC BASED MEDICAL GLOVES AND FORMULATIONS THEREFOR

(75) Inventors: Jian Tao, Reno, NV (US); Shuo Peng, Reno, NV (US)

(73) Assignee: Microflex Corporation, Reno, NV (US)

( * ) Notice: Subject to any disclaimer, the term of this patent is extended or adjusted under 35 U.S.C. 154(b) by 209 days.

(21) Appl. No.: 10/607,499

(22) Filed: Jun. 27, 2003

(65) Prior Publication Data

US 2004/0083531 A1 May 6, 2004

Related U.S. Application Data

(60) Provisional application No. 60/422,509, filed on Oct. 31, 2002.

(51) Int. Cl.
*A63B 71/14* (2006.01)
*A41D 19/00* (2006.01)
*C08K 5/15* (2006.01)

(52) U.S. Cl. .................. 2/159; 2/167; 2/168; 2/161.1; 524/114; 524/314

(58) Field of Classification Search ............... 524/114, 524/314; 2/167, 168, 159, 161.1
See application file for complete search history.

(56) References Cited

U.S. PATENT DOCUMENTS

| 3,059,241 A | | 10/1962 | O'Brien et al. |
| 4,340,514 A | * | 7/1982 | Housel ..................... 524/77 |
| 4,532,307 A | * | 7/1985 | Tada ........................ 525/451 |
| 4,740,545 A | * | 4/1988 | Ohachi ..................... 524/314 |
| 5,881,386 A | | 3/1999 | Horwege et al. |
| 6,012,169 A | | 1/2000 | Nishi et al. |
| 6,111,004 A | * | 8/2000 | Biesiada et al. ........... 524/311 |
| 6,706,806 B1 | * | 3/2004 | Lang et al. ................ 524/569 |

* cited by examiner

*Primary Examiner*—Peter D. Mulcahy
(74) *Attorney, Agent, or Firm*—Hoffman, Wasson & Gitler

(57) ABSTRACT

A new formulation for making a polyvinyl chloride (PVC, usually referred as vinyl in glove industry) glove has been disclosed in this invention. The resulting glove shows the following superior barrier integrity characteristics by comparing with current vinyl gloves in the market:
   Much lower in use failure rate
   Improved puncture strength and tensile strength
   Better chemical resistance The invention provides formulations to make compounds and methods to make such gloves. The new formulations and procedures could be easily realized economically under common vinyl glove production lines. Depending on the desired applications, both powdered and powder free gloves could be produced in the same formula.

4 Claims, No Drawings

PVC BASED MEDICAL GLOVES AND FORMULATIONS THEREFOR

The instant application is based on U.S. Provisional patent application Ser. No. 60/422,509, filed Oct. 31, 2002.

BACKGROUND OF THE INVENTION

The art of making PVC gloves was well established a long time ago. Poly Vinyl Chloride (PVC) and PVC containing copolymers, such as vinyl chloride-vinyl acetate copolymer, can be conventionally dipped with certain plasticizers.

Historically, due to its poor barrier integrity (low puncture strength and low tensile strength) and the fact that they are very uncomfortable to wear in comparison with natural and synthetic rubber latex gloves, their applications have been very limited. As a matter of fact, PVC gloves are not generally recommended for medical applications.

However, recently, driven by their low cost and the advantage of being free of proteins (that could cause Type I allergy) and being free of chemicals used for conventional rubber sulfur vulcanization (that could cause Type IV sensitivity), the volume of vinyl gloves has been increasing steadily, although mainly in low end applications.

Another shortcoming of vinyl gloves has emerged, "in use failure". It is reported that the "in use" failure rate can be as alarmingly high as 60%. In other words, it simply does not provide the function, hand protection to wearers, that it is designed to provide.

One family of commonly used plasticizers, in PVC products as well as in other gloves, is dialkyl phthalate. They can be toxic and can be extracted by cooking oils, hence they have been banned in food handling in some countries and several states in the USA. Even without such oil contact, they can migrate out of glove matrix to result in brittle gloves.

It is an object of the invention to provide gloves made from PVC that are suitable for medical applications.

It is another object of the invention to provide gloves made from PVC having improved barrier qualities.

It is still another object of the invention to provide gloves made from PVC that are comfortable to wear.

It is yet another object of the invention to use a plasticizer that is polymeric, so that it is more difficult to migrate out of the glove matrix.

It is another object of the invention to use a crosslinking agent

These and other objects will be apparent to one of ordinary skill in the art after reading the disclosure of the invention.

SUMMARY OF THE INVENTION

This invention describes methods and formulations to make PVC gloves with improved barrier integrity and comfort to wear so that the wearers can have peace of mind. The gloves produced in this invention showed substantial improvement in tensile strength, puncture strength, chemical resistance, and "in use" failure. To achieve this, a crosslinking agent, which is commonly used for rubbery materials, whereas not generally necessary for plastic materials, is employed. This invention will use a safer polymeric plasticizer and abandon the unfavorable dialkyl phthalate.

DETAILED DESCRIPTION OF INVENTION

Compounding:

Materials commonly used for glove making are polymers with long chain molecules, natural, or synthetic. They are also referred as plastics or rubbers. Usually the plastics are rigid, whereas rubbers are elastic. This property is mainly defined by polymer chain structure. The key characteristic to distinguish material behaviors is called glass transition temperature. Above the glass transition temperature, materials tend to behave with rubbery properties, i.e., elastic. Below glass transition temperature, materials are plastic like. In general, a material that has a glass transition temperature below room temperature, is called rubber. If its glass transition temperature is above room temperature, it is called plastic.

Temperature is one variable to change materials from plastic states to rubbery states. Adding a plasticizer is another. Polymeric plasticizers have very low glass transition temperatures. Ordinary plasticizers are small molecule organic liquids. After addition of plasticizers, the blend would exhibit a much lower glass transition temperature. In other words, a plastic becomes softer. That's how a thin film vinyl glove is made.

Because of aforementioned difference, vital differences are seen due to material processing and compounding. Rubbery materials have no mechanical strength and they have not much use at all at room temperature. They are just gums. Hence, they must be vulcanized. On the other hand, plastic materials exhibit certain mechanical strength without crosslinking. They don't have to be crosslinked.

As the result, rubbery materials show much better barrier properties. To break through, one has to break the chemical bonds, which is difficult. That's why it is relatively easy to break through plastic films for there is no chemical bond between polymer chains. To overcome this, we introduced a crosslinking agent, so that chemical bonds can bridge polymer chains like the vulcanization of rubbers.

The formulas are as follows:

TABLE 1

| Conventional PVC Glove | |
|---|---|
| Ingredients | PHR |
| Polyvinyl chloride | 100 |
| Di (2-ethyl hexyl) Phthalate | 100 |

TABLE 2

| PVC Glove of the Invention | |
|---|---|
| Ingredients | PHR |
| Polyvinyl chloride | 100 |
| Polyester based on dicarboxylic acids and polyhydric alcohols | 100 |
| 2,5-dimethyl-2,5-di (t-butylperoxy) hexane | 4 |

Mechanical Properties:

Films obtained from the above formula and vulcanization conditions show following characteristics:

| Description | Ultimate Elongation (%) | Telsile Strength (MPa) | Rupture Resistance (N/mm) | Puncture Strength (N) | After Use Failure (%) |
|---|---|---|---|---|---|
| Average of Conventional PVC | 389 | 13.19 | 171 | 2.95 | 50 |
| Uncrosslinked PVC Control | 368 | 15.46 | 217 | 2.29 | 28 |
| Crosslinked PVC | 353 | 18.68 | 278 | 5.84 | 11 |

Clearly, we have observed remarkable improvement on tensile strength, rupture resistance, puncture strength, and after use failure.

While the invention was been described with reference to a preferred embodiment, variations and modification would be apparent to one of ordinary skill in the art without departing from the spirit of the invention. The invention encompasses such modifications and variations and is defined by the appended claims.

We claim:

1. A glove, said glove made from polyvinyl chloride combined with a polyester plasticizer and a cross-linking agent, said cross-linking agent is 2,5-dimethyl-2, 5-di (t-butylperoxy)hexane.

2. A glove, said glove made from polyvinyl chloride combined with a nontoxic plasticizer and a cross-linking agent and a cross-linking agent, said cross-linking agent is 2,5-dimethyl-2, 5-di (t-butylperoxy) hexane.

3. The glove of claim 1, wherein said polyester plasticizer is based on dicarboxylic acids and poly hydric alcohols.

4. The glove of claim 2, wherein said polyester plasticizer is based on dicarboxylic acids and poly hydric alcohols.

* * * * *